Figure 1:
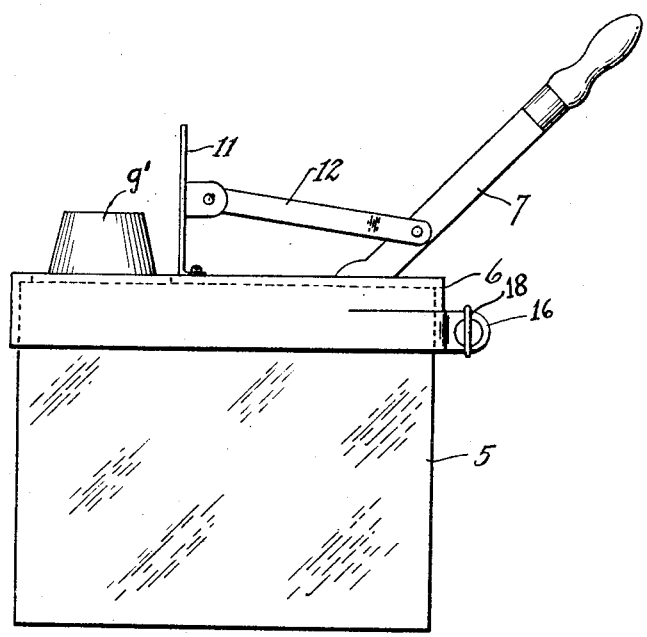

Sept. 24, 1929. O. LANGE 1,729,170
ICE CREAM CONE COATER
Filed July 5, 1924

INVENTOR:
Otto Lange
By E J Andrews
Atty.

Patented Sept. 24, 1929

1,729,170

UNITED STATES PATENT OFFICE

OTTO LANGE, OF CHICAGO, ILLINOIS

ICE-CREAM-CONE COATER

Application filed July 5, 1924. Serial No. 724,289.

This invention relates to ice-cream cone coaters and has for its object the production of apparatus for coating the surface of ice-cream cones and other articles with chocolate or other substances. Although in the drawings and in the following description I have shown the apparatus adapted to the purpose of coating the inside of the cones, yet it is to be understood that modifications could be made of the apparatus, by those skilled in the art, for coating the outside of cones, and the apparatus as shown could readily be modified and applied to the coating of various articles, such as edible dessert dishes, as well as to ice cream cones.

Figure 2:
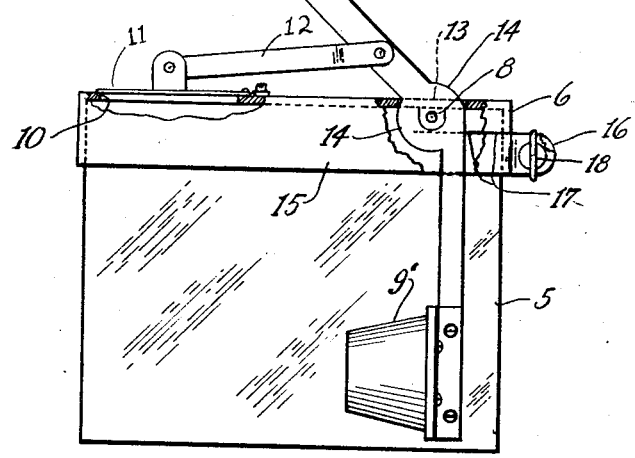

Of the accompanying drawing, Fig. 1 is an elevation of the apparatus embodying features of my invention, in position for coating the cones; and Fig. 2 is an elevation of the apparatus when not in use.

The apparatus comprises a casing or jar 5 which may be of any suitable material. I prefer glass for the purpose. The jar has a cover 6. Mounted in the cover is a lever 7 which is pivoted, by the pivot 8, to the cover. Fixed to the upper arm of the lever is a handle 9 and fixed to the lower end is the coater 9′ which comprises a member having a surface shaped similarly to the inner surface of that portion of the cone to be coated. Normally the coater is suspended downwardly in the jar and the jar contains the material which is to coat the cone. When in use, the coater, carrying with it a coat of the material, is turned upwardly by operating the handle 9 so as to pass the coater through the opening 10 and project it upwardly as indicated in Fig. 1. The coater will then have on its outer surface a coat of chocolate which may be imparted to the inner surface of the cone by placing the cone over the coater. The coater is then lowered for a new coat and the process may be repeated as often as may be desired.

In order to have the apparatus sanitary and the jar entirely closed when not in use I provide for the opening 10 a cover 11 which is hinged to the cover of the jar, and, by means of a link 12 is pivoted to the lever 7, so that, as the coater is returned to the jar by moving the handle to the left, the opening 10 will be closed by the cover 11. The cover 11 is again raised, as the coater is raised, by the handle. Also, in order to substantially close at all times the slot 13 in the jar through which the lever projects, I provide circular flanges 14 concentric with the pivot 8 so that one of the flanges will always close the slot in whatever position the handle may be.

In order to more completely close the jar I provide a wide annular flange 15 for the cover which fits snugly around the jar; and in order to clamp the cover to the jar I provide lugs 16 on the lower portion of the flange 15 and provide slits 17 in the flange 15 on opposite sides of the lugs 16. In this manner the lugs 16 may be sprung together so as to tightly clasp the jar; and, for this purpose, I provide a thumbscrew 18 which passes through one of the lugs 16 and is threaded into the other. In this manner the cover may be quickly removed from the jar, carrying with it the entire operating mechanism so as to fill the jar or to clean the apparatus; and it will be readily understood that the coater may be removed and other forms of coaters applied so as to coat other articles either internally or externally. When an external coating is to be provided for the coater would be formed hollow and shaped to conform with the outer surface to be coated.

I claim as my invention:

1. A coating apparatus comprising a jar, a cover adapted to be fixed to said jar, a lever pivoted to said cover with one end projecting inwardly and the other end projecting outwardly, a coating member fixed to the inwardly projecting end of the lever and adapted to be revolved upwardly, said cover having an opening therein through which said coating member will project when revolved upwardly, a cover for said opening, and means operated by said lever for opening said cover as said coating member is revolved upwardly.

2. A coating apparatus comprising a casing, a cover mounted on said casing, said cover having a slot therein, a lever projecting into said casing through said slot, said lever being pivoted to said cover adjacent said slot, said lever having circular flanges thereon concentric with said pivot and adapted to close said slot as said lever is rotated, and coating means fixed to the inwardly projecting end of said lever.

3. A coating apparatus comprising a jar, a cover adapted to be fixed to said jar, a lever pivoted to said cover with one end projecting inwardly and the other end projecting outwardly, a coating member fixed to the inwardly projecting end of the lever and adapted to be revolved upwardly, said cover having an opening therein through which said coating member will project when revolved upwardly, and means for detachably fixing said cover to said jar, said means comprising yielding strips projecting from said cover and means for clamping said strips against the sides of said jar.

4. A coating apparatus comprising a jar, a cover for said jar, a lever pivotally associated with said jar with one end projecting into said jar and the other end projecting outwardly, a coating member fixed to the inwardly projecting end of the lever, said cover having an opening therein through which said coating member projects when revolved upwardly, a closure for said opening, and means operated by said lever for opening said closure as said coating member is revolved upwardly.

5. A coating apparatus comprising a jar, a lever pivotally associated with said jar with one end projecting inwardly and the other end projecting outwardly, a coating member fixed to the inwardly projecting end of the lever, said jar having an opening therein through which said coating member projects when said lever is rotated, a closure for said opening, and means operated by said lever for opening said closure as said lever is rotated.

6. A coating apparatus comprising a casing having a slot therein, an arm projecting into said casing through said slot, said arm being pivoted to said casing adjacent said slot, said arm having flanges thereon adapted to close said slot as said arm is rotated, coating means fixed to the inwardly projecting end of said arm and a handle fixed to said arm and extending outwardly from said casing.

7. A coating apparatus comprising a casing having a slot therein, an arm projecting into said casing through said slot, said arm being pivoted to said casing adjacent said slot, said arm having flanges thereon adapted to close said slot as said arm is rotated, coating means fixed to the inwardly projecting end of said arm and a handle fixed to said arm and extending outwardly from said casing, said casing having an opening therein arranged to receive said coating means as said arm is rotated, means for closing said opening and means for opening said closing means when said arm is operated.

8. A coating apparatus comprising a jar, a lever pivotally associated with said jar with one end projecting inwardly and the other end projecting outwardly, a coating member fixed to the inwardly projecting end of the lever, said jar having an opening therein through which said coating member projects when said lever is rotated, a closure for said opening, and means operated by said lever for opening said closure as said lever is rotated, said means comprising a link fixed to said lever and to said closure.

In testimony whereof, I hereunto set my hand.

OTTO LANGE.